(12) United States Patent
Mueller

(10) Patent No.: US 6,942,888 B2
(45) Date of Patent: Sep. 13, 2005

(54) CHEESE EXTRUDING MACHINE AND PROCESS FOR PRODUCING PIECES OF CHEESE

(75) Inventor: Adam P. Mueller, Minerva, OH (US)

(73) Assignee: Minerva Dairy, Inc., Minerva, OH (US)

(*) Notice: Subject to any disclaimer, the term of this patent is extended or adjusted under 35 U.S.C. 154(b) by 334 days.

(21) Appl. No.: 10/350,710

(22) Filed: Jan. 24, 2003

(65) Prior Publication Data

US 2004/0144262 A1 Jul. 29, 2004

(51) Int. Cl.$^7$ .......................... A23C 19/00; A01J 25/00
(52) U.S. Cl. .......................... 426/516; 99/454; 99/455; 99/456; 99/459; 426/495; 426/524; 426/582
(58) Field of Search ................. 426/516, 518, 426/524, 582, 392, 495; 99/454, 455, 456, 458, 459

(56) References Cited

U.S. PATENT DOCUMENTS

| | | | |
|---|---|---|---|
| 3,748,072 A | | 7/1973 | Whelan |
| 3,966,970 A | | 6/1976 | Williams |
| 5,001,972 A | * | 3/1991 | Greenfield et al. ........... 99/454 |
| 5,146,845 A | * | 9/1992 | Pittelko ....................... 99/454 |
| 5,194,283 A | | 3/1993 | Dupas et al. |
| 5,404,802 A | | 4/1995 | Millerbernd et al. |
| 6,098,528 A | | 8/2000 | Hoogland |
| 6,180,153 B1 | | 1/2001 | Palus et al. |
| 6,267,048 B1 | | 7/2001 | Hoogland |
| 6,289,591 B1 | | 9/2001 | Rodriguez |
| 6,324,968 B2 | | 12/2001 | Hoogland |
| 6,337,099 B2 | | 1/2002 | Hoogland |
| 6,575,725 B1 | | 6/2003 | Keel |
| 2001/0017083 A1 | | 8/2001 | Hoogland |

FOREIGN PATENT DOCUMENTS

| | | |
|---|---|---|
| EP | 0 304 119 A2 | 2/1989 |
| EP | 0 596 948 B1 | 5/1994 |
| EP | 0 818 140 B1 | 1/1998 |
| JP | 54086911 | 2/1981 |
| JP | 56108222 | 1/1983 |
| JP | 63258959 | 4/1990 |
| JP | 02258311 | 5/1992 |
| JP | 09184216 | 3/1998 |
| WO | WO 9848636 A1 | 11/1998 |

* cited by examiner

Primary Examiner—George C. Yeung
(74) Attorney, Agent, or Firm—Sand & Sebolt (57) ABSTRACT

A cheese extruding machine and process for producing pieces of cheese of an exact weight directly from unaged or semi-aged cheese curds of semi-hard and hard cheeses. The cheese extruding machine includes a standard screw-type vacuum filler which receives large blocks of compressed curds, grinds the blocks into pieces, and compresses the curds into an airless, homogenous cheese flow without significantly damaging the curds. The cheese flow is forced through an elongate cheese forming tube of a desired cross-sectional shape for the cheese. A water jacket disposed about a second half of the cheese forming tube chills the periphery of the cheese flow to increase the firmness and maintain the shape of the cheese flow upon extrusion from the cheese forming tube. Frictional engagement between the cheese flow and the cheese forming tube produces back-pressure against the vacuum filler to maintain the cheese flow at a predetermined extrusion pressure and consistent density. A cutting device disposed at the end of the cheese forming tube cuts the extruded cheese flow into the exact weight pieces of cheese based on rate of cheese flow from the vacuum filler.

38 Claims, 7 Drawing Sheets

CHEESE EXTRUDING MACHINE AND PROCESS FOR PRODUCING PIECES OF CHEESE

BACKGROUND OF THE INVENTION

1. Technical Field

Generally, the invention relates to a machine and process for producing pieces of cheese from blocks of compressed curds. Particularly, the invention relates to a cheese extruding machine and process for producing pieces of cheese of an exact net weight from the blocks of compressed curds. Specifically, the invention relates to a cheese extruding machine and process for producing pieces of cheese of an exact weight directly from unaged or semi-aged cheese curds of semi-hard and hard cheeses from which the whey has been drained and compressed to form the cheese blocks.

2. Background Information

Cheese is a common food product used as appetizers such as on crackers and nachos, or cooked in foods such as pizza, lasagna, and a wide variety of other foods too numerous to list. There is a wide variety of cheeses available, including soft cheeses such as cream cheese, semi-hard cheeses such as Cheddar, Colby, Monterey Jack, Low Moisture Mozzarella, Low Moisture Provolone, Lace Swiss, and various flavor varieties thereof, and hard cheeses such as Romano, Low Moisture Cheddar and Parmesan.

All such cheeses are made primarily from milk to which a starter culture of microbes is added to form cultured milk in a heated mixing kettle. The cultured milk is ripened by heating and stirring, and rennet added to curdle the cultured milk into a mixture of gelatinous curds and liquid whey. The curds in the mixture are cut up in the kettle into smaller curds and the mixture is heated to cook the curds. The mixture is transferred to a curd separation device such as an elongate table which drains the liquid whey from the mixture. The remaining curds on the table with any residual whey clinging to the curds are stirred to lower the pH of the curds. Salt is added to the curds and they are stirred to form salted curds.

The salted curds with residual whey are placed in a cheese forming tower forming a cheese column to compress the curds to remove the residual whey and produce solid cheese. The cheese forming towers are sold by many manufactures and are typically about thirty feet tall in order to form a cheese column of about the same height, and use the weight of the cheese column to expel the residual whey and compress the curds at a lower portion of the cheese column into solid cheese. A guillotine type horizontal cutter is used to chop off the solid cheese into large cheese blocks weighing about 40 lbs. each. The cheese blocks are aged in a cooler for a period of at least 7 days to more than 4 months, depending on the type of cheese being produced. During the aging process the cheese blocks lose water, crack, and lose uniformity of density. Following aging, the cheese blocks are sent to a cheese cutting factory where they are cut up into smaller consumer-size pieces of cheese and packaged such as in plastic wrap or bags. These consumer-size pieces of cheese are typically between about a half-pound to one pound in net weight, though they vary in weight due to the lost water, cracks, and non-uniform density caused by the aging process.

Although the current cheese production machines and processes are adequate for the purpose for which they were intended, they have some serious shortcomings. Firstly, the consumer size pieces of cheese vary considerably in weight. This results in time-consuming hand-weighing of the individual pieces of cheese, or additional cost by cutting the pieces of cheese slightly larger than necessary to assure a minimum net weight. Secondly, the process is not a continuous process from curd to consumer-size pieces of cheese production, with the aging period which interrupts the production cycle. The aging of the cheese blocks also requires large areas of costly refrigerated storage space often for many months for each batch of cheese blocks.

Therefore, the need exists for an improved cheese production machine and process which produces the pieces of cheese of an exact weight directly from large cheese blocks. The machine and process should eliminate storage and aging of the large in-process-sized cheese blocks for later cutting into consumer-sized pieces of cheese. The machine and process should utilize existing machinery to save on machinery costs. The cheese produced should final age after packaging substantially without changing net weight.

BRIEF SUMMARY OF THE INVENTION

Objectives of the invention include providing a cheese production machine and process which produces consumer-sized pieces of cheese of an exact net weight.

Another objective is to provide a cheese production machine and process which produces the pieces of cheese of an exact weight directly from unaged or semi-aged cheese curds of semi-hard and hard cheeses.

A further objective is to provide a cheese production machine and process which compresses the cheese curds to a uniform density to facilitate precise net weights upon being extruded.

Still another objective is to provide a cheese production machine and process which eliminates storage and aging of the large in-process-sized cheese blocks for later cutting into consumer-sized pieces of cheese.

These objectives and advantages are obtained by an improved cheese extruding machine, a cheese manufacturing line which utilizes the cheese extruding machine, and a process for producing cheese of the present invention, all for producing pieces of cheese of an exact weight.

The general nature of the cheese extruding machine for producing pieces of cheese of an exact weight directly from unaged or semi-aged cheese curds of semi-hard and hard cheeses from which the whey has been drained and compressed to form large in-process-sized cheese blocks may be stated as including: a filler; an elongate cheese forming tube; and a cooling device. The filler includes an input hopper which receives the cheese blocks and a cutter which grinds the cheese blocks from the hopper into smaller cheese pieces. A feed device compresses the cheese pieces substantially without damaging the curds into a uniform, homogeneous cheese flow while removing air therefrom. The cheese flow is output at a cheese output of the filler. The cheese forming tube has a predetermined internal cross-sectional shape with a first end affixable to the filler at the cheese outlet to receive the cheese flow. A second end of the cheese forming tube extrudes the cheese flow in the cross-sectional shape for slicing to predetermined lengths. The cooling device chills the cheese forming tube to chill the periphery of the cheese flow to increase the firmness and maintain the shape of the cheese flow upon extrusion from the second end of the cheese forming tube. Frictional engagement between the cheese flow and the cheese forming tube produces back-pressure against the feed device to maintain the cheese flow within the cheese forming tube at the second end at a predetermined extrusion pressure. This produces consistent density for cut off at predetermined lengths forming finished, exact weight pieces of cheese which may be immediately packaged and which age in the package without substantially changing weight.

A preferred cheese extruding machine has a vacuum filler which reduces pressure of the air around the cheese pieces to remove the air from the cheese pieces as the cheese flow is formed. The feed device comprises a pair of feed screws having respective parallel drive shafts driven to rotate together with respective spiral threads intermeshing, the filler further including a merge tube which includes the cheese outlet. The merge tube transitions the cheese flow from the feed screws into the cheese forming tube. The cooling device comprises a water jacket disposed about the cheese forming tube which utilizes chilled water to cool the cheese flow. A cutting device to which the second end of the cheese forming tube is affixable is adapted to cut the cheese flow extruded from the second end into the exact weight pieces of cheese based on rate of cheese flow from the filler.

The general nature of the cheese manufacturing line for producing pieces of cheese of an exact weight from raw ingredients including pasteurized milk, a starter culture of microbes, and rennet may be stated as including: a heated mixing container; a curd separator; a cheese formation tower; and the cheese extruding machine. The mixing container has an interior chamber for containing the raw ingredients and resulting curd-whey mixture, and a heating device to heat the raw ingredients to desired temperatures. A movable beater is disposable in the interior chamber to agitate the raw ingredients and cut the curd. The curd separator has a curd support surface to receive the curd-whey mixture from the mixing container and drain off the whey, leaving curds with residual whey. The cheese formation tower has an upright outer casing of a tubular configuration with an upper end to receive the curds from outlet pipe and an open lower end. The tower forms a cheese column therein to drain the residual whey and compress the curds at a bottom portion of the cheese column to form solid cheese. A cutting blade is disposed adjacent the bottom portion of the cheese column to cut cheese blocks therefrom. The cheese extruding machine is of the type described above and utilizes the cheese blocks.

A preferred cheese manufacturing line includes a curd pump having an inlet to receive the curds with residual whey from the curd separator and pump them through an outlet pipe to an outlet opening thereof connectable to the cheese formation tower. The curd pump includes a screw shaft mounted within a housing which includes respective external wire-form threads which are oppositely wound and adapted to feed the curds inwardly of the screw shaft into the inlet. A pump is adapted to pump the curds and residual whey through the outlet pipe to the outlet opening thereof.

The general nature of a first process for producing pieces of cheese of an exact weight directly from unaged or semi-aged cheese curds of semi-hard and hard cheeses from which the whey has been drained and compressed to form large in-process-sized cheese blocks may be stated as including the steps of: grinding the cheese blocks into smaller cheese pieces; compressing the cheese pieces into a cheese flow; moving the cheese flow through an elongate cheese forming tube of a predetermined internal cross-sectional shape to form and maintain the cheese flow in the cross-sectional shape; cooling at least a portion of the cheese forming tube to chill the periphery of the cheese flow; extruding the cooled cheese flow from an end of the cheese forming pipe; and cutting the cheese flow extruded from the end of the cheese forming pipe. The cheese pieces are compressed substantially without damaging the curds into a uniform, homogeneous cheese flow while removing air therefrom. Frictional engagement between the cheese flow and the cheese forming tube produce back-pressure within the cheese forming tube to maintain the cheese flow at the extruding end thereof at a predetermined extrusion pressure for consistent density of the cheese flow. The chilling of the periphery of the cheese flow increase the firmness and maintains the cross-sectional shape of the cheese flow. The cutting of the cheese flow extruded from the end of the cheese forming pipe is based on the rate of cheese flow from the filler, forming finished, exact weight pieces of cheese which may be immediately packaged and which age in the package without substantially changing weight.

In a preferred first process for producing the pieces of cheese of an exact weight, the step of compressing the cheese pieces is conducted using a filler device having at least one feed screw and under reduced pressure of the air around the cheese pieces to remove the air from the cheese pieces as the cheese flow is formed. The cheese pieces are initially at a temperature of about 86° F. The filler device has a pair of feed screws having respective parallel drive shafts driven to rotate together with respective spiral threads intermeshing. The threads increase in thickness from respective input ends to respective output ends so as to decrease respective inter-thread spaces to gradually increase the pressure on the cheese in the inter-thread spaces as the cheese progresses from the input ends to the output ends. The cheese forming tube used in the step of moving the cheese flow through the cheese forming tube is about 18 feet long. The step of cooling the cheese forming tube comprises cooling a second half of the cheese forming tube using a cooling jacket disposed about the cheese forming tube which utilizes chilled water to cool the cheese flow. The cheese flow is cooled to an internal temperature of about 84° F. and an external temperature of about 45° F.

The general nature of a second process for producing pieces of cheese of an exact weight from raw ingredients including pasteurized milk, a starter culture of microbes, and rennet may be stated as including the steps of: forming a curd-whey mixture from the raw ingredients; draining liquid whey from the curd-whey mixture leaving curds with residual whey; forming a cheese column of the curds with residual whey in a cheese formation tower to force out the liquid whey and form solid cheese; and cutting cheese blocks of the solid cheese from the bottom portion of the cheese column which are fed into the first process for producing pieces of cheese of an exact weight. The forming of the cheese column uses the weight of the curds to force out the liquid whey and compress the curds at a bottom portion of the cheese column into solid cheese.

In a preferred second process for producing the pieces of cheese of an exact weight, the step of forming a curd-whey mixture includes the steps of: combining the pasteurized milk and the starter culture of microbes to form cultured milk for producing a batch of cheese; ripening the cultured milk by heating and stirring for about one-half hour at a temperature of about 90° F.; dropping the pH of the cultured milk; adding rennet to curdle the cultured milk into a mixture of gelatinous curds and liquid whey; cutting up the curds in the mixture into smaller curds; and heating the mixture to a temperature of between about 103° F. to 104° F. for about thirty minutes to cook the curds. The step of draining liquid whey from the curd-whey mixture includes the steps of: stirring the curds with residual whey to lower the pH of the curds to between about 5.7 to 5.9; and adding salt to the curds and stirring to form salted curds. The step of forming the cheese column of the curds includes removal of the residual whey by at least a portion of the cheese column being exposed to a pressure below atmospheric to expedite the removal of the residual whey from the curds.

BRIEF DESCRIPTION OF THE SEVERAL VIEWS OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DETAILED DESCRIPTION OF THE INVENTION

Figure 1:
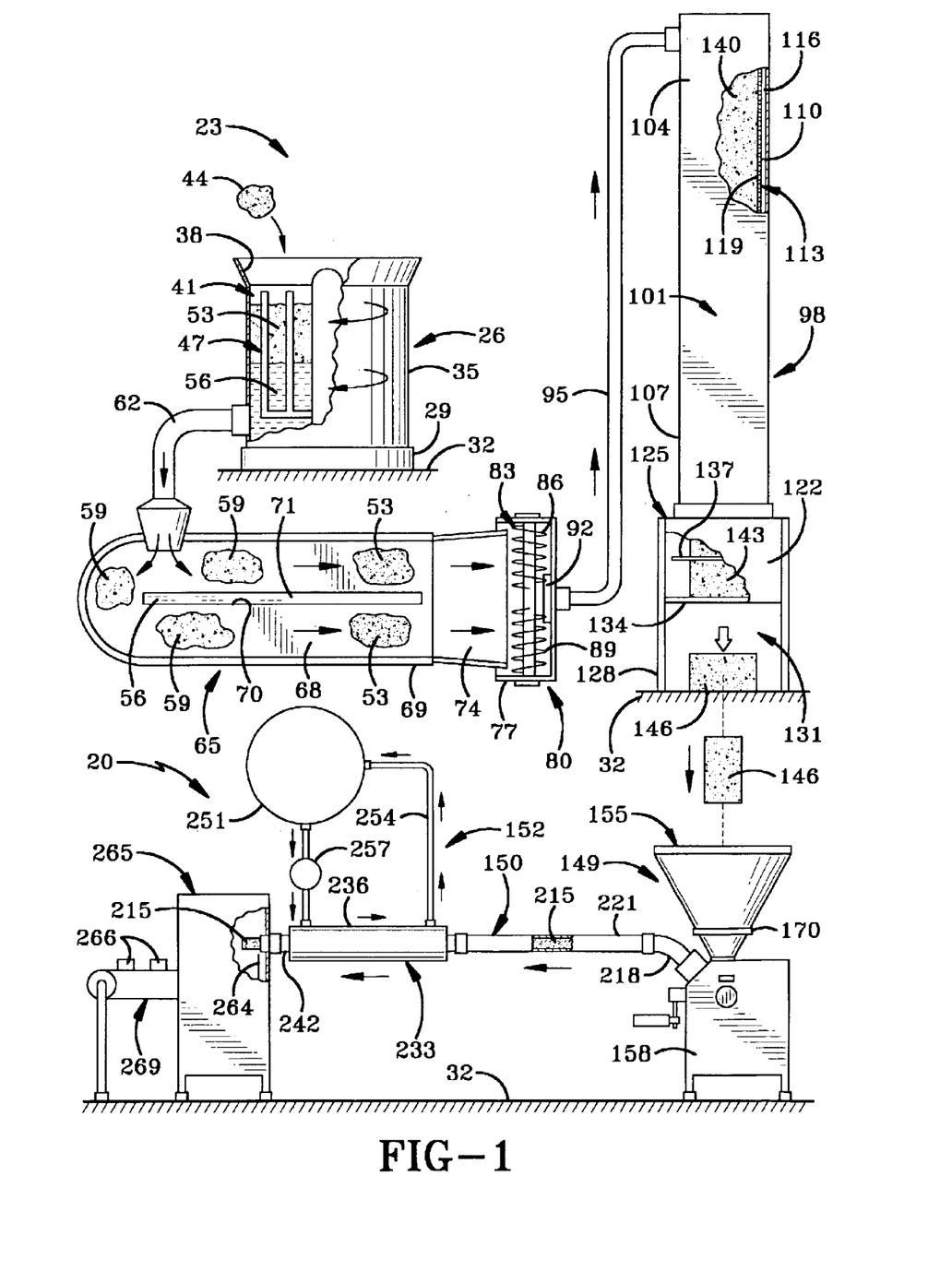
FIG. 1 is a diagrammatic view of the cheese extruding machine of the present invention including a vacuum filler and a cheese cooling system, as used with conventional cheese manufacturing equipment in a batch process of making cheese in a cheese manufacturing plant.
Figure 2:
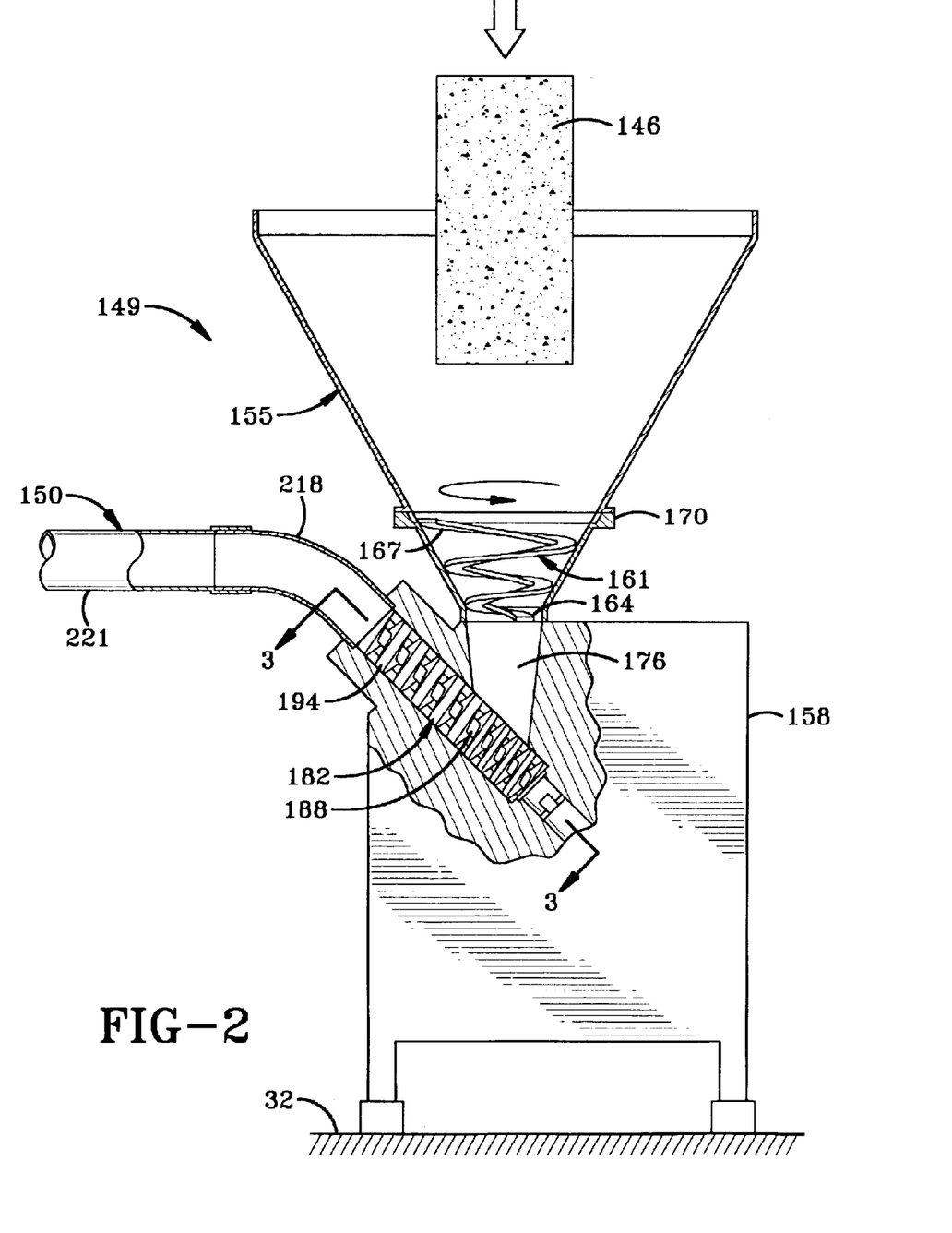
FIG. 2 is a side elevational view of the extruder partially cut away to show a large cheese block being placed inside a hopper which houses a spiral grinding blade, with a pair of feed screws, a merge tube, and a cheese forming tube also shown.
Figure 3:
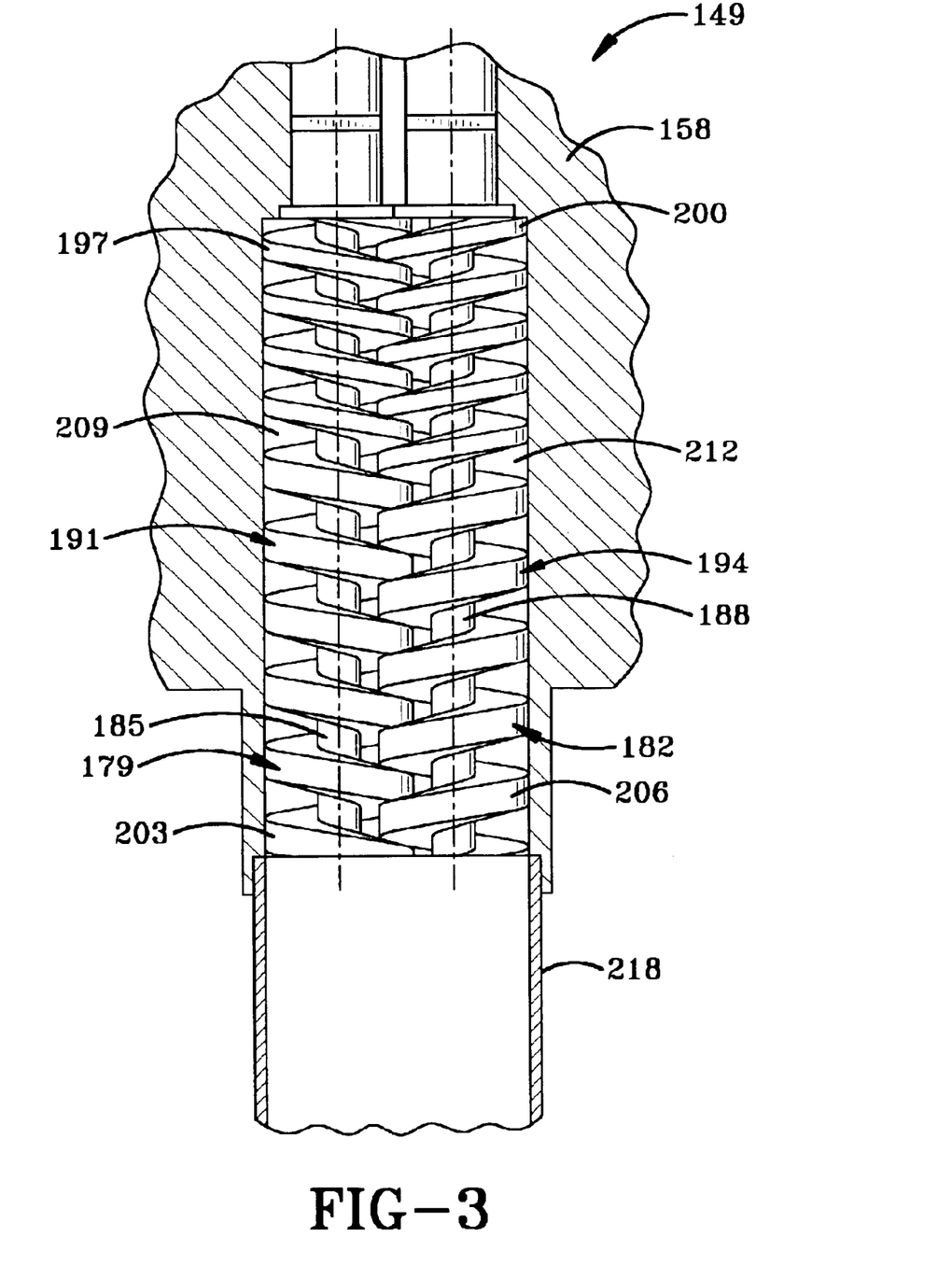
FIG. 3 is a sectional view taken along line 3—3 of FIG. 2, showing the inter-engagement of the feed screws.
Figure 4:
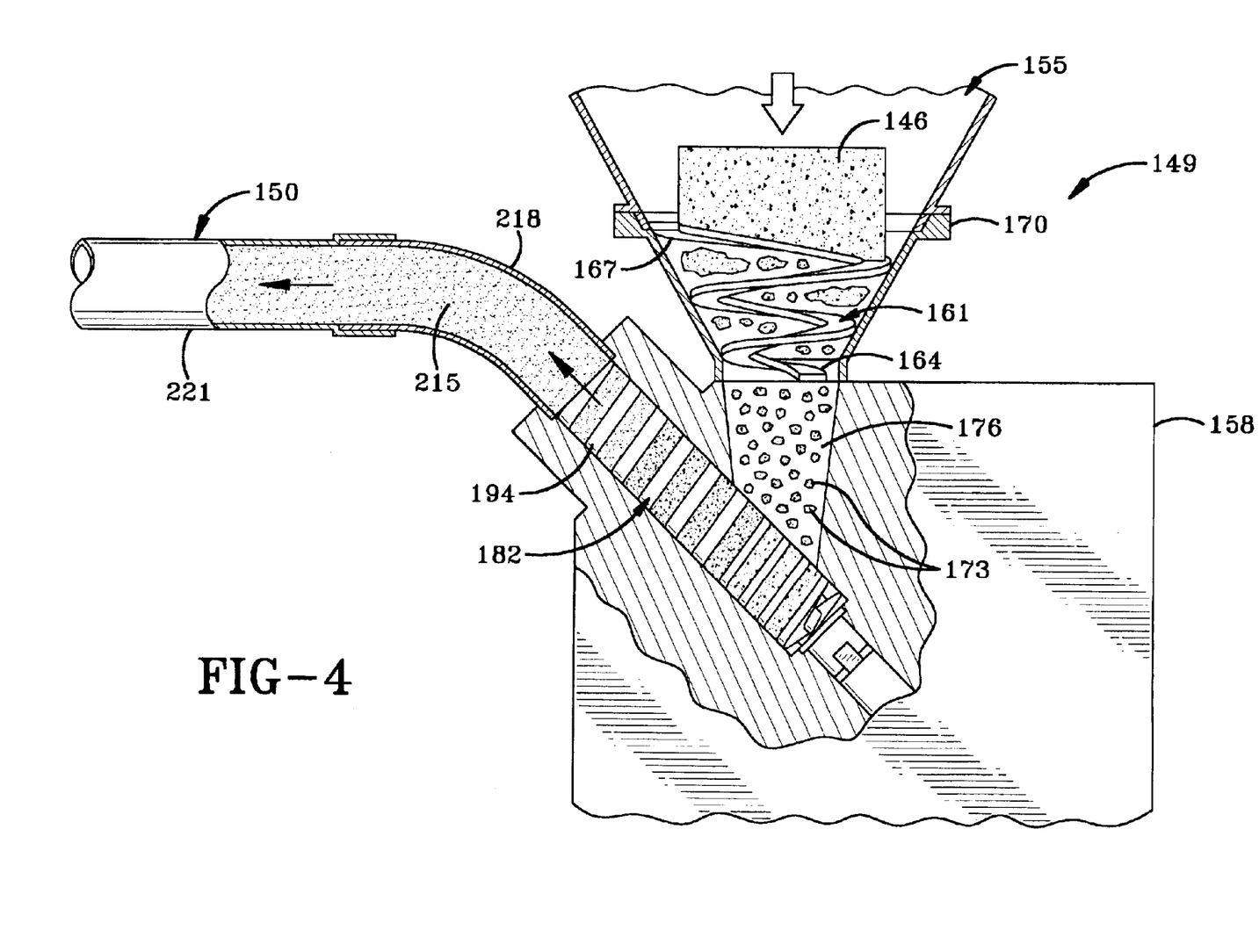
FIG. 4 is a side elevational view of the extruder of FIG. 2 showing the large cheese block being ground up into smaller pieces of cheese inside the cheese-receiving funnel by the spiral cutting blade, and fed by the feed screws through the merge tube and into the cheese forming tube.

The cheese extruding machine of the present invention is shown in FIG. 1, and is indicated generally at 20, as used with conventional cheese manufacturing equipment 23 in a batch process of making cheese in a cheese manufacturing plant.

The cheese manufacturing equipment 23 includes a conventional heated cooking or mixing kettle 26 having a circular base 29 supported by a floor 32 of the cheese manufacturing plant. An upstanding cylindrical wall 35 terminates at a flared, open top 38 and defines an interior chamber 41 for containing raw ingredients 44 for producing a batch of cheese. The base 29 includes electrical heating coils (not shown) to heat the raw ingredients 44 to a desired temperature, and a drive motor with gear box (not shown) to rotatively drive a vertically oriented rotary beater 47 disposed in the interior chamber 41 to agitate the raw ingredients 44.

The raw ingredients 44 for producing a batch of cheese, including pasteurized milk and a starter culture of microbes, are added to the mixing kettle 26 and stirred about one-half hour at a temperature of about 90° F. for the resulting mixture to ripen. The pH of the mixture is then dropped and rennet (originally procured from a cow's stomach) is added to coagulate or curdle the milk into curds 53 of the consistency of gelatin. Liquid whey 56 forms under the curds 53, which are lighter than the whey 56. The rotary beater 47 cuts the curds 53 into smaller curds, and the temperature is increased in the mixing kettle 26 to about 103° to 104° F. for about thirty minutes to cook the curds 53. A valve (not shown) of a flexible outlet pipe 62 is then opened to allow the batch of the curd-whey mixture 59 to gravity feed from the mixing kettle 26 through the flexible outlet pipe 62.

A conventional curd separator table 65 includes a generally horizontally disposed, elevated curd support surface 68 bordered by an upstanding rim 69 onto which the curd-whey mixture 59 is deposited from the outlet pipe 62. The flexibility of outlet pipe 62 allows the curd-whey mixture 59 to be evenly deposited along the length of support surface 68 with the rim 69 preventing the curd-whey mixture 59 from falling off onto the floor 32. The support surface 68 is slightly laterally inwardly tilted from each side toward a longitudinal drain slot 70 such that the liquid whey 56 flows through the drain slot 70 onto a slightly inclined collection tray 71 which drains the whey 56 for recycling or disposal. The curds 53 remain on the support surface 68 and are stirred using various stirring implements (not shown) to lower the pH of the curds 53 to between about 5.7 to 5.9. Salt is then applied to and mixed with the curds 53. The curds 53 are pushed by hand from the support surface 68 onto an outlet chute 74 of the curd separator table 65.

The curds 53 are pushed off the outlet chute 74 into a housing 77 of a curd pump device 80. The curd pump device 80 includes a screw shaft 83 mounted transversely of the outlet chute 74 within housing 77. The screw shaft 83 includes respective external wire-form threads 86 and 89 which are oppositely wound to feed curds 53 inwardly. The screw shaft 83 is rotatively driven by a motor and gear box combination (not shown) of curd pump device 80 such that the curds 53 are moved inwardly of screw shaft 83 and fall into a central outlet opening 92 of housing 77. The curds 53 are pumped from the central outlet opening 92 through an outlet pipe 95 using a curd pump (not shown) of the curd pump device 80.

The curds 53 and any remaining whey 56 are fed from outlet pipe 95 into a conventional upright cheese formation tower 98. The tower 98 includes an outer casing 101 about thirty-five feet in height having a closed upper end 104 for receiving the curds 53 from outlet pipe 95 and an open lower end 107. A perforated inner tube 110 is disposed within tower 98, forming an elongate cheese-receiving chamber 113, and a coaxially disposed drainage chamber 116 disposed between the outer casing 101 and the inner tube 110. The interior of the inner tube 110 is coated with a low friction material 119 to facilitate downward sliding movement of cheese contained therein. The lower end 107 of outer casing 101 is mounted to a housing 122 of a cheese cutter 125 supported above the floor 32 on a plurality of vertical legs 128 such that a cheese block receiving space 131 is formed below housing 122. A movable support plate 134 is horizontally disposed in cheese cutter 125 covering the open lower end 107 of outer casing 101. A movable guillotine type cutting blade 137 is horizontally disposed above the support plate 134 a predetermined vertical cutting distance.

The tower 98 is filled with curds 53 and any remaining whey 56 through outlet pipe 95, forming a vertically disposed cheese column 140 supported by the support plate 134 of cheese cutter 125. The weight of the curds 53 forces the liquid whey 56 radially outwardly into the drainage chamber 116, flowing downwardly through a lower outlet (not shown) from drainage chamber 116 at the lower end 107 of outer casing 101 for recycling or disposal. Those curds 53 located closest adjacent support plate 134 are compressed to form solid cheese 143 in the cheese column 140. A vacuum device (not shown) may be used which lowers the pressure within drainage chamber 116 below atmospheric to expedite the removal of the remaining whey 56 from the curds 53. The tower 98 may also be divided into respective upper and a lower parts such that different pressures can simultaneously exist in the upper and the lower part during any portion of the cycle. The cutting blade 137 is used to cut the cheese column 140, producing large cheese blocks 146 of circular cross-section and typically weighing about 40 lbs. each. The large cheese blocks 146 are individually cut and released into the cheese block receiving space 131 when the support plate 134 is moved from supporting engagement therewith. The cutting blade 137 then supports the cheese column 140 until the support plate 134 is moved back into supporting position and the cutting blade 137 is withdrawn therefrom, allowing the cheese column 140 to drop onto the support plate 134 to continue additional compression and cutting cycles.

In the past, the cheese blocks 146 have been transported to a room for aging period of from several days to many months depending on the type of cheese to be produced, then following the aging period cut up into pieces of cheese of approximately the desired weight using conventional cutting or slicing machines (not shown). The density of the cheese varies considerably due to the aging of such large cheese blocks and exact weight pieces were not possible. The cheese extruding machine 20 permits immediate continued processing of the cheese blocks 146 into finished, exact weight pieces of cheese which are immediately packaged.

Figure 6:
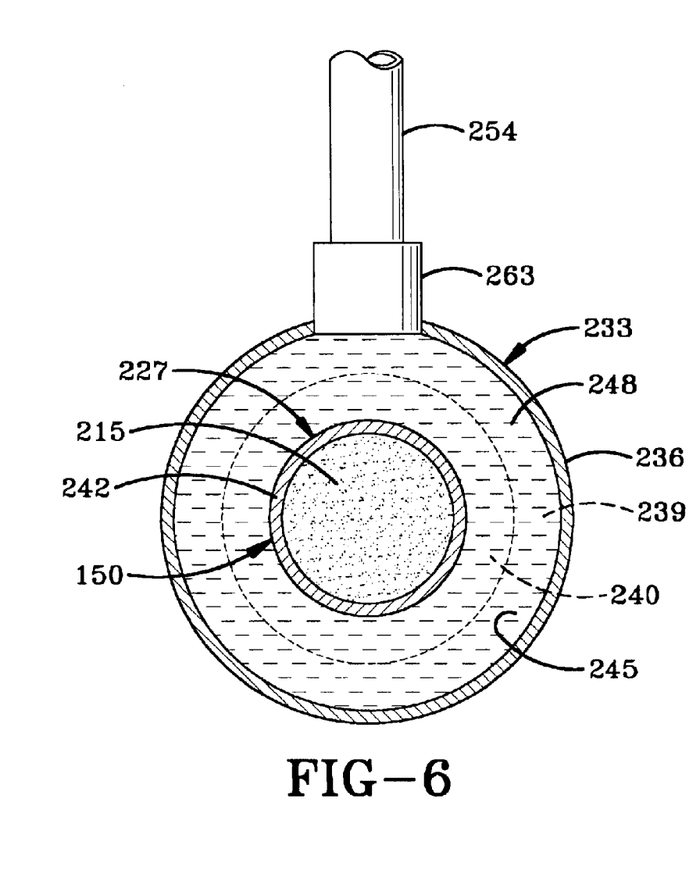
FIG. 6 is a lateral vertical sectional view of the water jacket and cheese forming pipe taken along line 6—6 of FIG. 5 as used to produce round mini-horns of cheese.
Figure 7:
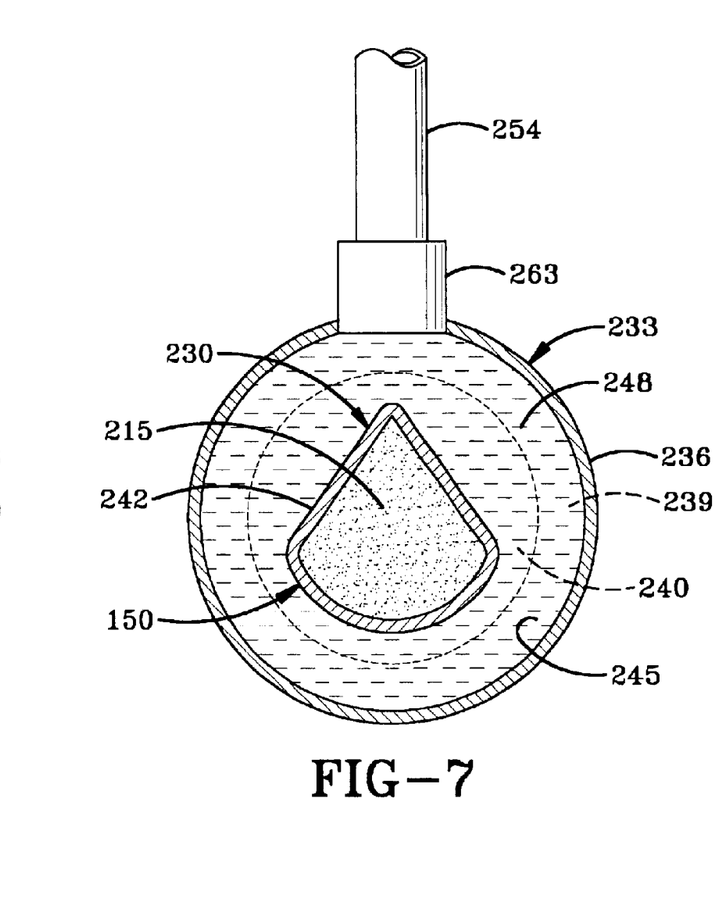
FIG. 7 is a lateral vertical sectional view of the water jacket and an alternate cheese extrusion pipe corresponding to FIG. 6 as used to produce pie-shaped pieces of cheese.

In accordance with the invention, the cheese extruding machine 20 includes a vacuum filler 149, a cheese forming tube 150 of predetermined, preferably constant, cross-sectional shape, and a cooling device (described subsequently) used with a water cooling system 152. The components of the cheese extruding machine 20 which contact the cheese curd are preferably made of stainless steel as is customary in the food industry for sanitary reasons. The cheese blocks 146 are manually or automatically loaded into a funnel-shaped input hopper 155 mounted to a housing 158 of the vacuum filler 149. A vertically-oriented spiral cutter 161 is rotatively driven by a motor and gear box arrangement (not shown) at a lower end 164, with an upper end 167 being supported by a rub ring 170 of hopper 155. Cheese blocks 146 made of compressed curds 53 are semi-cured and are rather easily broken into smaller cheese pieces 173 by contact with the spiral cutter 161 and fall through a cheese input passageway 176 onto a feed device comprising a pair of feed screws 179 and 182 having respective parallel, upwardly inclined drive shafts 185 and 188 driven to rotate together with respective spiral threads 191 and 194 intermeshing. The threads 191 and 194 increase in thickness from respective cheese input ends 197 and 200 to output ends 203 and 206 so as to decrease respective inter-thread spaces 209 and 212 to increase the pressure on the cheese pieces 173 to compress them into a uniform, homogeneous cheese flow 215 substantially without damaging the curds 53 while removing air therefrom. The cheese flow 215 enters an upwardly angled merge tube 218 leading into a first half tube 221 of the cheese extruding tube 150, having the predetermined cross-section such to extrude the cheese flow 215, for example, in a mini-horn shape 227 (FIG. 6) or in a pie shape 230 (FIG. 7).

Various suitable vacuum fillers are on the market designed for grinding and extruding food products such as link sausage. One example is the ROBOT 500 Vacuum Filler sold by VEMAG Maschinenbau GmbH of Verden, Germany. The vacuum filler includes a feed hopper for loading food product fillings, a double screw feed arrangement transports product filling from the feed hopper to an outlet of the filler machine gently and without crushing. The low friction conveying of the product filling permits weight-accurate portioning. A vacuum system evacuates the product filling and can be adjusted to a residual vacuum of 10 mbar. The vacuum filler generates filling pressures of up to 20 bar. Various filling heads and different cutters allow the production of many different shapes. The vacuum filler as used to produce link sausage with natural or synthetic casings using a linking gear and a casing holding device or length portioning device. However, such a device has not been used to move cheese as defined therein. Additionally, other types of filler devices may be utilized, such as piston-type extruders which are commercially available.

Figure 5:
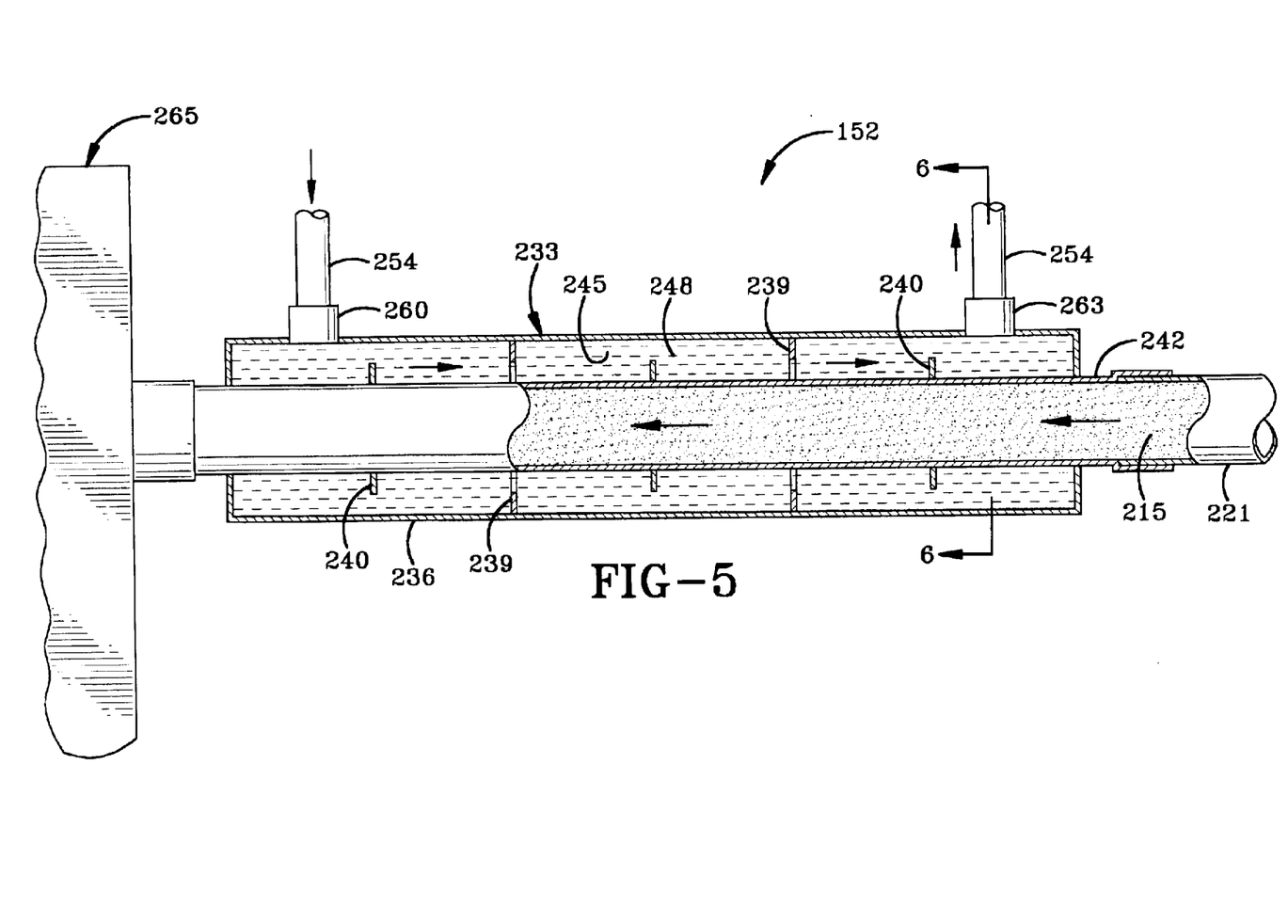
FIG. 5 is a side elevational view of a water jacket of the cheese cooling system disposed about the cheese forming pipe, shown in partial longitudinal cross-section with the opposite flow directions of the cheese flow and the cooling water.
Figure 8:
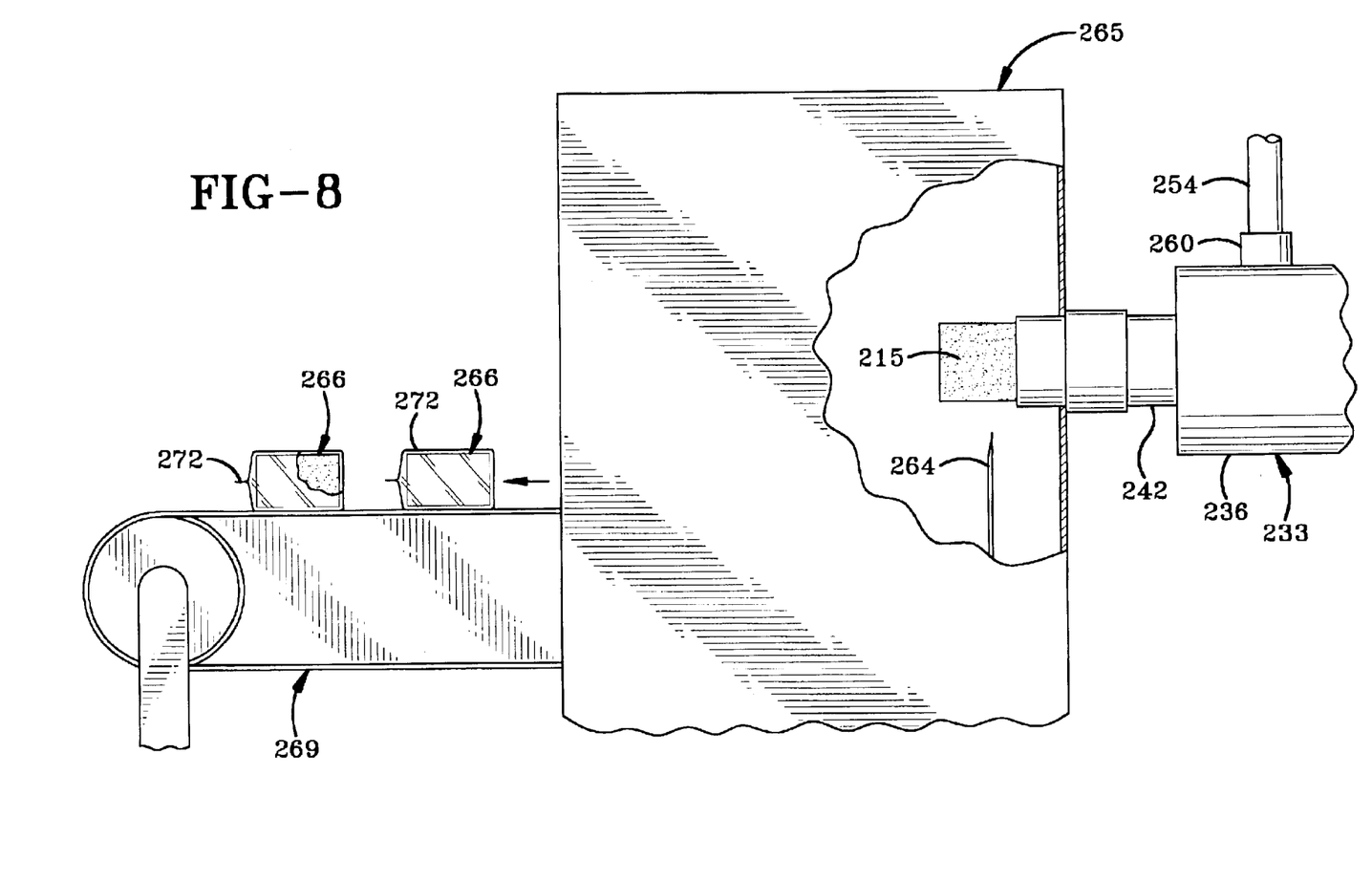
FIG. 8 is a side elevational view of the cheese extrusion pipe with water jacket as connected to a cheese cutter and bagger, showing extruded and bagged consumer size pieces of cheese being carried away on a conveyor.

The cooling device is preferably a reverse flow heat exchanger 233 comprising a water jacket 236 with a plurality of circular baffle plates 239 and 240 disposed about a second half tube 242 of the cheese forming pipe 150, forming a cooling water chamber 245 therebetween. Cooling water 248 is supplied for the cooling water system 152 from a cooling water source 251. The cooling water system 152 includes piping 254 leading to and from the cooling water source 251 and a pump 257. Cooling water 248 flows from the cooling water source 251 through the pump 257 into an inlet 260 of heat exchanger 233. The cooling water 248 flows through the water chamber 245 in a circuitous path around the baffle plates 239 and 240 in the opposite direction from cheese flow 215 to maximize the heat gradient and rate of heat transfer from the cheese flow 215 to the cooling water 248. The cooling water 248 is recirculated, passing through an outlet 263 into piping 254 back to the cooling water source 251 for re-cooling. While cheese forming pipe 150 may have a variety of lengths without departing from the spirit of the invention, it has been found that a pipe having a length of 18 feet is sufficient to allow adequate back-pressure so that the cheese completely fills the pipe and is allowed to solidify and harden so that a properly shaped end product results. Additionally, it has been found that cheese forming pipe 150 should be equally split, such that the first half tube is approximately 9 feet and the second half tube 242 is approximately 9 feet Again, other lengths may be used without departing from the spirit of the invention and, given the diameter of this cheese, it may be beneficial to use different lengths of pipe to assure that adequate back-pressure is realized for the entire cheese product. Further, it is important to note that the length of cheese forming pipe 150 is dependent upon the amount of pressure which may be placed on the curds without degrading the quality of the curd, while simultaneously assuring that the entire pipe is filled based on the back-pressure which results from the friction between the pipe in the non-cooled first half and the cooled second half of the cheese forming pipe 150, but not allowing so much back-pressure that the cheese becomes stopped up and difficult to remove from cheese forming pipe 150. The cheese flow 215 is extruded from the cheese forming pipe 150 within a cutter/bagger device 265 and sliced to length by a pneumatic blade 264 to form consumer size cheese pieces 266. The cheese pieces are bagged and carried away on a conveyor 269 for further packaging such as sealing of the plastic bag 272, shrink wrapping, wax coating, or other operation at a packaging machine (not shown) for immediate packaging.

Additionally, the cheese flow 215 could travel into multiple cheese forming pipes 150. If small cross-sectional shapes are desired, such as circles or squares, which would more likely be packaged as snack cheese for use on crackers and meat and cheese trays.

Many variations of the present invention are possible while staying within the same inventive concept. For example, the vacuum filler may be of an alternate design which still provides the required homogenous cheese flow substantially without damaging the curds. Virtually any shape of cheese may be extruded using a cheese forming tube of suitable cross-sectional shape. The water jacket may be of different designs which achieves the required cooling of the cheese flow. The large cheese blocks may be produced using other types of kettles, curd separators, and cheese block formers.

Accordingly, the cheese extruding machine, a cheese manufacturing line which utilizes the cheese extruding machine, and a process for producing cheese of the present invention, provide consumer-sized pieces of cheese of an exact net weight directly from unaged or semi-aged cheese curds of semi-hard and hard cheeses, compresses the cheese to a uniform density to facilitate precise net weights upon being extruded, utilizes existing machinery to produce the cheese blocks used by the cheese extruding machine and process, eliminates storage and aging of the large in-process-sized cheese blocks for later cutting into consumer-sized pieces of cheese, and produces the consumer-sized pieces of cheese which final age after packaging substantially without changing net weight, and which solves problems and satisfies needs existing in the art which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cheese extruding machine, cheese manufacturing line which utilizes the cheese extruding machine, and a process for producing cheese are constructed and used, the characteristics of the construction, and the advantageous, new and useful results obtained; the new and useful structures, devices, elements, arrangements, parts and combinations, are set forth in the appended claims.

What is claimed is:

1. A cheese extruding machine comprising:
   a filler which includes an input hopper adapted to receive the cheese blocks, a cutter adapted to reduce the cheese blocks from said hopper into smaller cheese pieces, and a feed device adapted for compressing the cheese pieces substantially without damaging the curds into a uniform, homogeneous cheese flow which cheese flow is output at a cheese output thereof;
   an elongate cheese forming tube of a predetermined internal cross-sectional shape having a first end which is affixable to said filler at said cheese outlet to receive the cheese flow, and a second end adapted to extrude the cheese flow in said cross-sectional shape for slicing to predetermined lengths; and
   a cooling device associated with and adapted for chilling the cheese forming tube to chill the periphery of the cheese flow to increase the firmness and maintain the shape of the cheese flow upon extrusion from said second end of said cheese forming tube.

2. The cheese extruding machine defined in claim 1 wherein the feed device comprises at least one feed screw.

3. The cheese extruding machine defined in claim 2 in which there are a pair of feed screws having respective parallel drive shafts driven to rotate together with respective spiral threads intermeshing.

4. The cheese extruding machine defined in claim 3 wherein the filler includes a merge tube which includes the cheese outlet, said merge tube which transitions the cheese flow from the feed screws into the cheese forming tube.

5. The cheese extruding machine defined in claim 3 in which the threads of the feed screws increase in thickness from the input ends to output ends so as to decrease respective inter-thread spaces to gradually increase the pressure on the cheese in said inter-thread spaces as the cheese progresses from said input ends to said output ends.

6. The cheese extruding machine defined in claim 1 in which the cooling device comprises a water jacket disposed about the cheese forming tube which utilizes chilled water to cool the cheese flow.

7. The cheese extruding machine defined in claim 6 in which the cooling jacket includes a plurality of water-deflecting baffles.

8. The cheese extruding machine defined in claim 6 wherein the cheese forming tube comprises respective first and second half tubes which interconnect end-to-end, said first half tube having the first end which is affixable to the filler, and said second half tube having the second end from which the cheese flow is extruded.

9. The cheese extruding machine defined in claim 8 wherein each of the first and second half tubes is about 9 feet long.

10. The cheese extruding machine defined in claim 8 wherein the cooling jacket is disposed about the second cheese forming tube.

11. The cheese extruding machine defined in claim 1 wherein the filler is a vacuum filler which reduces pressure of the air around the cheese pieces to remove the air from the cheese pieces as the cheese flow is formed.

12. The cheese extruding machine defined in claim 1 further including a cutting device to which the second end of the cheese forming tube is affixable, said cutting device being adapted to cut the cheese flow extruded from said second end into the exact weight pieces of cheese based on rate of cheese flow from the filler.

13. The cheese extruding machine defined in claim 12 wherein the cutting device includes a bagging device to package the exact weight pieces of cheese.

14. The cheese extruding machine defined in claim 1 in which the cutter adapted to reduce the cheese block from said hopper into a smaller cheese piece and the feed device adapted for compressing the cheese pieces substantially without damaging the curds into a uniform homogenous cheese flow are housed in a single unit.

15. The cheese extruding machine defined in claim 14 in which the single unit is a vacuum filler and in which the feed device includes multiple feed screws.

16. A cheese extruding machine comprising:

a vacuum filler which includes an input hopper adapted to receive the cheese blocks, a cutter adapted to reduce the cheese blocks from said hopper into smaller cheese pieces, and a feed device adapted for compressing the cheese pieces substantially without damaging the curds into a uniform, homogeneous cheese flow which cheese flow is output at a cheese output thereof, said feed device comprising a pair of feed screws having respective parallel drive shafts driven to rotate together with respective spiral threads intermeshing, said filler further including a merge tube which includes the cheese outlet, said vacuum filler which reduces pressure of the air around the cheese pieces to remove the air from the cheese pieces as the cheese flow is formed;

an elongate cheese forming tube of a predetermined internal cross-sectional shape having a first end which is affixable to said filler at said cheese outlet to receive the cheese flow, and a second end adapted to extrude the cheese flow in said cross-sectional shape for slicing to predetermined lengths, said merge tube which transitions the cheese flow from said feed screws into said cheese forming tube;

a cooling device associated with and adapted for chilling the cheese forming tube to chill the periphery of the cheese flow to increase the firmness and maintain the shape of the cheese flow upon extrusion from said second end of said cheese forming tube, said cooling device comprising a water jacket disposed about said cheese forming tube which utilizes chilled water to cool the cheese flow;

wherein frictional engagement between the cheese flow and the cheese forming tube produces back-pressure against said feed device to maintain the cheese flow within said cheese forming tube at said second end at a predetermined extrusion pressure for consistent density for cut off at predetermined lengths forming finished, exact weight pieces of cheese which may be immediately packaged and which age in the package without substantially changing weight.

17. The cheese extruding machine defined in claim 16 in which the threads of the feed screws increase in thickness from the input ends to output ends so as to decrease respective inter-thread spaces to gradually increase the pressure on the cheese in said inter-thread spaces as the cheese progresses from said input ends to said output ends, the cheese forming tube comprises respective first and second half tubes which interconnect end-to-end, said first half tube having the first end which is affixable to the filler, and said second half tube having the second end from which the cheese flow is extruded, said first and second half tubes each being about 9 feet long, the cooling jacket being disposed about said second cheese forming tube and including a plurality of water-deflecting baffles.

18. The cheese extruding machine defined in claim 17 further including a cutting device to which the second end of the cheese forming tube is affixable, said cutting device being adapted to cut the cheese flow extruded from said second end into the exact weight pieces of cheese based on rate of cheese flow from the filler, and wherein the cutting device includes a bagging device to package the exact weight pieces of cheese.

19. A cheese manufacturing line for producing pieces of cheese from raw ingredients including pasteurized milk, a starter culture of microbes, and rennet, comprising:

a heated mixing container having an interior chamber for containing the raw ingredients and resulting curd-whey mixture, said mixing container having a heating device to heat the raw ingredients to desired temperatures, and a movable beater disposable in said interior chamber to agitate the raw ingredients and cut the curd;

a curd separator having a curd support surface adapted to receive the curd-whey mixture from the mixing container and drain off the whey, leaving curds with residual whey;

a cheese formation tower having an upright outer casing of a tubular configuration with an upper end adapted to receive the curds from said curd separator and an open lower end, said tower being adapted to form a cheese column therein to drain the residual whey and compress the curds at a bottom portion of the cheese column to form solid cheese, and a cutting blade disposed adjacent the bottom portion of the cheese column to cut cheese blocks therefrom;

a filler which includes an input hopper adapted to receive the cheese blocks from the cheese formation tower, a cutter adapted to grind the cheese blocks from said hopper into smaller cheese pieces, and a feed device adapted for compressing the cheese pieces substantially without damaging the curds into a uniform, homogeneous cheese flow which cheese flow is output at a cheese output thereof;

an elongate cheese forming tube of a predetermined internal cross-sectional shape having a first end which is affixable to said filler at said cheese outlet to receive the cheese flow, and a second end adapted to extrude the cheese flow in said cross-sectional shape for slicing to predetermined lengths; and a cooling device associated with and adapted for chilling the cheese forming tube and the periphery of the cheese flow to increase the firmness thereof and maintain the shape of the cheese flow upon extrusion from said second end of said cheese forming tube.

20. The cheese manufacturing line defined in claim 19 further including a curd pump having an inlet adapted to receive the curds with residual whey from the curd separator and pump them through an outlet pipe to an outlet opening thereof connectable to the cheese formation tower, said curd pump which includes a screw shaft mounted within a housing, said screw shaft which includes respective external wire-form threads which are oppositely wound and adapted to feed the curds inwardly of said screw shaft into the inlet, and a pump adapted to pump the curds and residual whey through said outlet pipe to said outlet opening thereof.

21. A process for producing pieces comprising the steps of:

grinding cheese blocks into smaller cheese pieces;

compressing the cheese pieces substantially without damaging the curds into a uniform, homogeneous cheese flow;

moving the cheese flow through an elongate cheese forming tube of a predetermined internal cross-sectional shape to form and maintain the cheese flow in the cross-sectional shape;

producing back-pressure within the cheese forming tube to maintain the cheese flow at an extruding end thereof at a predetermined extrusion pressure for consistent density of the cheese flow;

cooling at least a portion of the cheese forming tube to chill the periphery of the cheese flow to increase the firmness and maintain the cross-sectional shape of the cheese flow;

extruding the cooled cheese flow from an end of the cheese forming pipe; and cutting the cheese flow extruded from the end of the cheese forming pipe based on rate of cheese flow from the filler.

22. The process defined in claim 21 in which the step of compressing the cheese pieces is conducted with the cheese pieces initially at a temperature of about 86° F.

23. The process defined in claim 21 in which the step of cooling the cheese forming tube to chill the periphery of the cheese flow comprises cooling the cheese flow to an internal temperature of about 84° F. and an external temperature of about 45° F.

24. The process defined in claim 23 in which the step of compressing the cheese pieces is conducted with the cheese pieces initially at a temperature of about 86° F.

25. The process defined in claim 21 in which the step of compressing the cheese pieces is conducted using a filler device having at least one feed screw.

26. The process defined in claim 21 in which the step of compressing the cheese pieces is conducted under reduced pressure of the air around the cheese pieces to remove the air from the cheese pieces as the cheese flow is formed.

27. The process defined in claim 21 in which the cheese forming tube used in the step of moving the cheese flow through the cheese forming tube is about 18 feet long.

28. The process defined in claim 27 in which the step of cooling the cheese forming tube comprises cooling a second half of the cheese forming tube.

29. The process defined in claim 21 in which the step of cooling the cheese forming tube utilizes a cooling jacket disposed about the cheese forming tube which utilizes chilled water to cool the cheese flow.

30. The process defined in claim 21 in which the step cutting the cheese flow to predetermined lengths comprises forming exact weight pieces of cheese having net weights from about one-half pound to five pounds.

31. The process defined in claim 21 in which the large in-process-sized cheese blocks used in the step of grinding the cheese blocks into smaller cheese pieces substantially comprise cheese curds of semi-hard cheeses selected from the group consisting of Cheddar, Colby, Monterey Jack, Low Moisture Mozzarella, Low Moisture Provolone, Lace Swiss, and flavor varieties of these cheeses.

32. The process defined in claim 21 in which the large in-process-sized cheese blocks used in the step of grinding the cheese blocks into smaller cheese pieces substantially comprise cheese curds of hard cheeses selected from the group consisting of Romano, Low Moisture Cheddar, Parmesan, and flavor varieties of these cheeses.

33. The process defined in claim 21 further including the step of packaging the exact weight pieces of cheese.

34. The process defined in claim 21 in which the step of compressing the cheese pieces is conducted using a filler device having at least one feed screw and under reduced pressure of the air around the cheese pieces to remove the air from the cheese pieces as the cheese flow is formed.

35. A process for producing pieces of cheese of an exact weight from raw ingredients including pasteurized milk, a starter culture of microbes, and rennet, comprising the steps of:

forming a curd-whey mixture from the raw ingredients;

draining liquid whey from the curd-whey mixture leaving curds with residual whey;

forming a cheese column of the curds with residual whey in a cheese formation tower to using weight of the curds to force out the residual whey and compress the curds at a bottom portion of the cheese column into solid cheese;

cutting cheese blocks of the solid cheese from the bottom portion of the cheese column;

grinding the cheese blocks into smaller cheese pieces;

compressing the cheese pieces substantially without damaging the curds into a uniform, homogeneous cheese flow;

moving the cheese flow through an elongate cheese forming tube of a predetermined internal cross-sectional shape to form and maintain the cheese flow in the cross-sectional shape;

cooling at least a portion of the cheese forming tube to chill the periphery of the cheese flow to increase the firmness and maintain the cross-sectional shape of the cheese flow; and extruding the cooled cheese flow from an end of the cheese forming pipe.

36. The process defined in claim 35 in which the step of forming a curd-whey mixture includes the steps of:

combining pasteurized milk and a starter culture of microbes to form cultured milk for producing a batch of cheese;

ripening the cultured milk by heating and stirring for about one-half hour at a temperature of about 90° F.;

dropping the pH of the cultured milk;

adding rennet to curdle the cultured milk into a mixture of gelatinous curds and liquid whey;

cutting up the curds in the mixture into smaller curds; and heating the mixture to a temperature of between about 103° F. to 104° F. for about thirty minutes to cook the curds.

37. The process defined in claim 36 in which the step of draining liquid whey from the curd-whey mixture includes the steps of:

stirring the curds with residual whey to lower the pH of the curds to between about 5.7 to 5.9; and adding salt to the curds and stirring to form salted curds.

38. The process defined in claim 37 in which the step of forming the cheese column of the curds includes removal of the residual whey by at least a portion of the cheese column being exposed to a pressure below atmospheric to expedite the removal of the residual whey from the curds.

* * * * *